(No Model.)
J. W. HYATT.
APPARATUS FOR FEEDING REAGENTS.
No. 417,035. Patented Dec. 10, 1889.
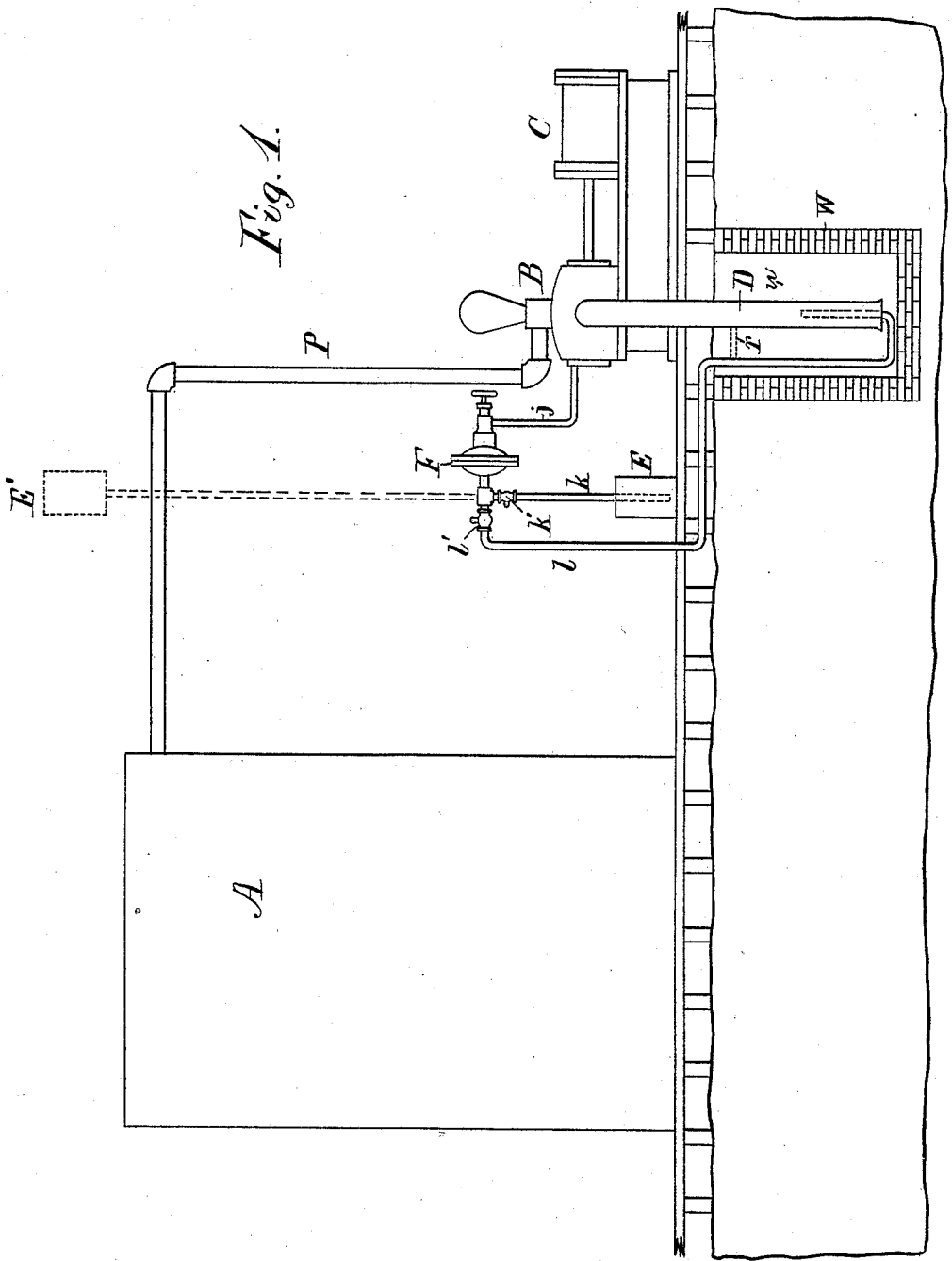

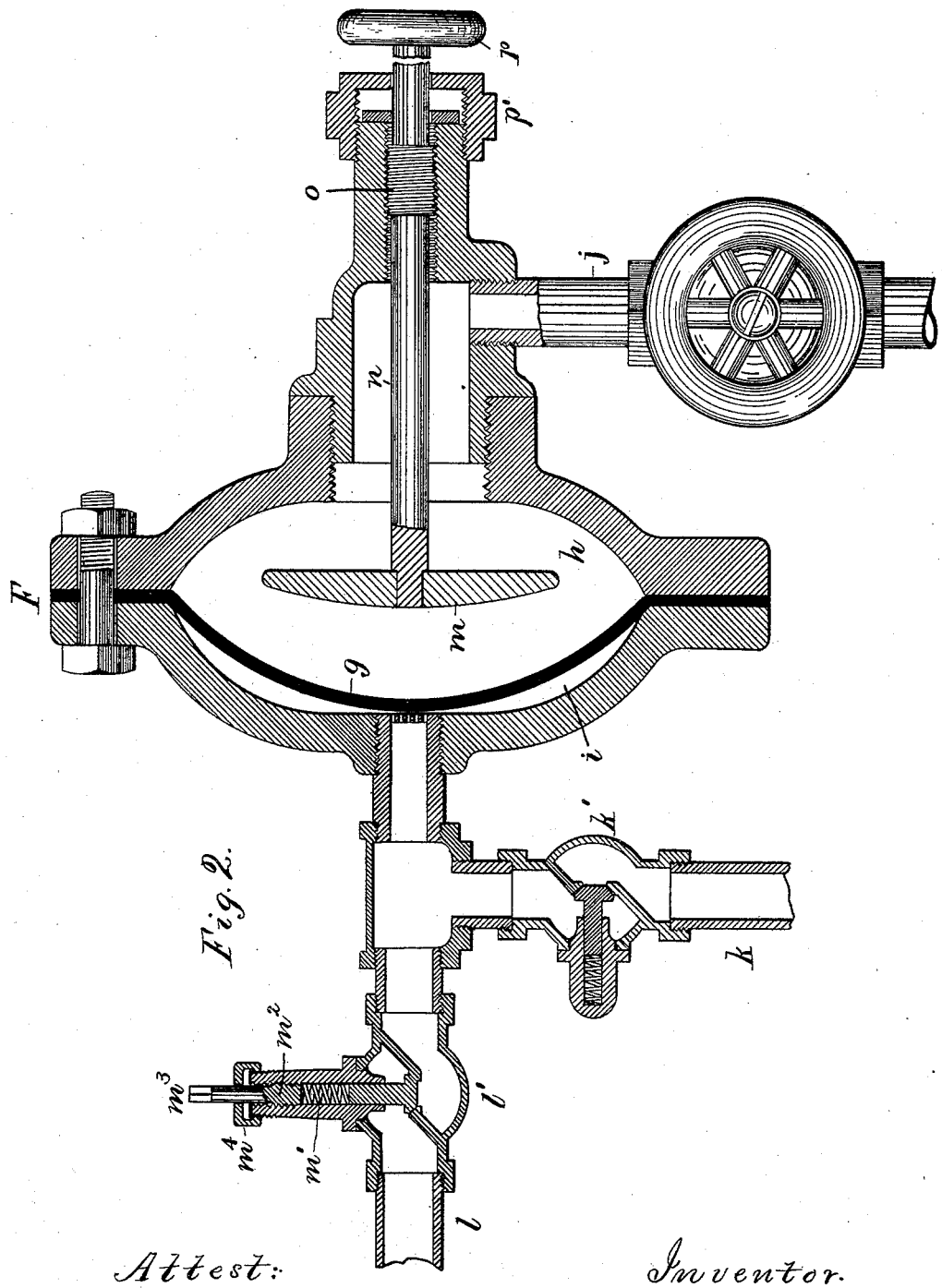

UNITED STATES PATENT OFFICE.

JOHN W. HYATT, OF NEWARK, NEW JERSEY, ASSIGNOR TO THE HYATT PURE WATER COMPANY, OF NEW JERSEY.

APPARATUS FOR FEEDING REAGENTS.

SPECIFICATION forming part of Letters Patent No. 417,035, dated December 10, 1889.

Application filed May 10, 1889. Serial No. 310,350. (No model.)

*To all whom it may concern:*

Be it known that I, JOHN W. HYATT, a citizen of the United States, residing at Newark, Essex county, New Jersey, have invented certain new and useful Improvements in Precipitant or Reagent Feeders, fully described and represented in the following specification and the accompanying drawings, forming a part of the same.

This invention is an improvement upon that claimed in the application Serial No. 310,136, filed by Charles H. Kendrick, in which claim is made to a filter having a supply-pump for controlling the passage of the fluid through the filter and a feeder actuated by the intermittent variation of pressure in the fluid-cylinder of the supply-pump. In Kendrick's construction the coagulant-feeder required a motor-cylinder having a motor-piston for operating a coagulant-pump plunger of smaller area than the piston in such motor-cylinder, in order to deliver the coagulant against the pressure within the filter, which would necessarily correspond with the pressure in the cylinder of the supply-pump. In my present invention I deliver the precipitant or coagulant into the suction-pipe of the supply-pump, where only atmospheric pressure exists, and thus avoid any resistance to the operation of the feeder, the precipitant being drawn through the suction-pipe into the supply-pump and delivered by the same to the filter as perfectly as if delivered directly from the coagulant-feeder, as in Kendrick's invention.

My precipitant-feeder is provided with check-valves, through one of which the precipitant is drawn from the precipitant-receptacle, and through the other of which it is discharged to the suction-pipe of the supply-pump; and I prevent the vacuum in the supply-pump from drawing the precipitant directly from its receptacle (through the said check-valves) by loading one of the check-valves to a point above atmospheric pressure.

As the pump-plunger in my invention may be made of the same diameter as the motor-piston, a movable diaphragm may be employed to perform the function of both these elements; but where desired a cylindrical plug moving in a cylinder, as in Kendrick's construction, may be employed, with the intermittent pressure operating upon one side and the coagulant in contact with the other. It is evident that a movable diaphragm is the exact equivalent of such a cylindrical plug, and such a diaphragm is shown herein, as it is the form of construction I prefer.

I have for convenience termed the movable diaphragm a "motor-piston" herein, such expression being more generic in form and better adapted to represent not only a movable diaphragm, but any equivalent movable element.

My improvement will be understood by reference to the annexed drawings, in which—

Figure 1 represents a filter with a supply-pump and coagulant-feeder attached, a pump-well being shown in section beneath the supporting-floor; and Fig. 2 is a longitudinal section of the precipitant-feeder upon its center line, with a cock inserted in the pressure-pipe.

The supply-pump is represented as drawing its water from a well W and delivering it to the filter A through pipe P.

B is the water-cylinder of the pump, which is represented as actuated by a steam-cylinder C; but for the purposes of my invention might be actuated by any other suitable means.

D is a suction-pipe of the water-pump; E, a tank of coagulant, and F the casing of the precipitant-feeder, containing a diaphragm $g$, which separates the spaces within the casing into a pressure-chamber $h$ and a coagulant-chamber $i$.

The operation of the supply-pump draws the water to be filtered into the suction-pipe $d$ and discharges it through the pipe P into the filter, thus producing an alternate pressure and suction within the water-cylinder B. A pipe $j$ is connected with the interior of the water-cylinder and with the pressure-chamber $h$, and the diaphragm $g$ is thus subjected to the intermittent pressure and suction which are alternately produced in the pump-cylinder. The precipitant-chamber $i$ upon the opposite side of the diaphragm is connected by pipe $k$ with the precipitant-receptacle E and by pipe $l$ with the interior of the suction-pipe D. The variations of pressure in the chamber $h$ produce a vibration of the diaphragm $g$, thus converting the chamber $i$ into a pump. The check-valve $k'$ in the pipe $k$ permits the flow of the precipitant from the tank to the chamber $i$, and a check-valve $l'$ in the valve $l$ permits the flow from the chamber to the suction-pipe $d$. The variations of pressure in the chamber $h$ produce a vibration of the diaphragm $g$, thus alternately enlarging and diminishing the capacity of the chamber. The chamber thus serves, in conjunction with the check-valves $k'$ and $l'$, as a pump to draw a specific volume of the precipitant from the receptacle E and discharge it to the pipe P in the desired manner. A disk or plate $m$ is sustained within the chamber $h$ upon the end of an adjustable rod $n$, which, by means of a screw-thread $o$ and hand-wheel $p$, may be moved in and out of the chamber to adjust the disk to and from the diaphragm. That side of the diaphragm in communication with the chamber $h$ may be termed the "pressure side," and the opposite side in contact with the precipitant the "feeding side." The atmospheric pressure operates upon the liquid in the receptacle E and through the pipe $k$ upon the feeding side of the diaphragm, and thus operates, when the vacuum or any pressure less than that of the atmosphere is induced in the chamber $h$, to move the diaphragm into contact with the disk $m$. The precipitant is thus supplied to the chamber by atmospheric pressure and is discharged therefrom by any increase of pressure in the pump-cylinder B, which pressure is transmitted to the chamber $h$ and forces the diaphragm away from the disk, as shown in Fig. 2.

A stuffing-box $p'$ is shown applied to the rod $n$, adjacent to the hand-wheel $p$; but any other means may be used for varying the stroke of the diaphragm in the casing F.

The pipe $l$ is shown extended down into the well W and turned upward into the lower end of the pipe D, which avoids the formation of any hole in the pipe which might impair the vacuum therein; but the pipe may be inserted directly in the suction-pipe at any point, as shown at $r$, above the level of the water $w$ in the well.

It is obvious that the pressure which is developed in the pump-cylinder B would be transmitted to the diaphragm $g$ at the beginning of each stroke of the pump, and that the coagulant would thus be delivered into the suction-pipe while the water was being drawn through the same into the pump. The coagulant would thus be mingled uniformly with the water and would be discharged with the same through the pipe P into the filter, as desired. As the diaphragm vibrates once at each actuation of the pump E, the volume of precipitant delivered into the pipe $d$ is exactly proportional to the number of strokes of the pump and to the volume of water delivered by the same to the filter, and by adjusting the disk $n$ to or from the diaphragm the volume of such coagulant delivered for each stroke of the pump may be accurately regulated.

It is obvious that the pump would not be used to deliver water to the filter unless the water were delivered above the atmospheric pressure, and the intermittent pressure in the chamber $h$ would therefore always be sufficient to draw the precipitant from the tank E and deliver it to the vacuum-pipe D.

In a construction where the precipitant is delivered directly into the filter a diaphragm subjected to the pump-pressure only upon one side and operated directly upon the precipitant at the other side could not be employed, as the pressure in the chamber $h$ would be balanced or more than balanced in the chamber $i$. My arrangement, therefore, for delivering the precipitant into the suction-pipe of the pump enables me to avoid the use of a motor-piston actuated by the variation of pressure in the pump-cylinder and a coagulant-pump plunger of less area, to deliver the precipitant to the filter under pressure. I am thus enabled to use a diaphragm for the movable element instead of a cylindrical piston, and the number of parts is thus greatly diminished and the utmost simplicity of construction is secured.

The tank E is shown in full lines arranged below the level of the chamber $h$; but it may, if preferred, be placed above the same, as indicated in dotted lines E'.

It will be noticed by reference to Fig. 1 that it is necessary to have the coagulant in the tank or receptacle E exposed to atmospheric pressure, and if the check-valve $l'$ were capable of opening under atmospheric pressure the suction induced in the vacuum-pipe D by the action of the steam-pump might therefore operate to draw the precipitant directly from the tank E, and the supply of precipitant would not be therefore regulated in the desired manner. To prevent such an action of the apparatus, I load the check-valve $l'$ nearest to the suction-pipe D in any convenient manner to a point exceeding atmospheric pressure, and thus prevent the suction in the pipe D from opening such check-valve independently of the pressure exerted upon the check-valve by the diaphragm $g$. In Fig. 2 the stem of such check-valve is shown provided with a spring $m'$ and with an adjusting-screw $m^2$ for regulating the tension of the spring to the desired point. The screw has a shank $m^3$, extended through a stuffing-box $m^4$, to adjust the screw, as desired. It is obvious that a weight would operate the same as a spring in such construction.

I have termed my invention a "precipitant-feeder;" but the apparatus is obviously adapted to feed any liquid under the same conditions, and it is plain that it may be used to deliver any kind of chemical reagent under analogous conditions.

Having thus set forth my invention, what I claim herein is—

1. The combination, with a filter and a supply-pump controlling the passage of the fluid through the filter, and having a fluid-cylinder in which the pressure is intermittently varied, of a suction-pipe through which the fluid is drawn to the supply-pump, a diaphragm or an equivalent motor-piston reciprocated by the intermittent pressure in the fluid-cylinder, a precipitant-chamber alternately enlarged and diminished by the movement of the motor-piston, a receptacle of precipitant, a pipe and check-valve connecting the same with the precipitant-chamber, and a pipe and check-valve connecting the precipitant-chamber with the suction-pipe of the pump, the whole arranged and operated to deliver a charge of precipitant into the said suction-pipe at each reciprocation of its pump, as and for the purpose set forth.

2. In a precipitant-feeder for filters, the combination, with a filter and a supply-pump supplying the water to the filter, of a suction-pipe through which the fluid is drawn to the supply-pump, a chamber containing a flexible diaphragm, a pipe connecting the pressure side of the diaphragm with the water-cylinder of the pump, an adjustable stop applied to the pressure side of the diaphragm to regulate its vibrations, a pipe connecting the opposite side of the diaphragm with a receptacle of precipitant, a pipe connecting the same side of the diaphragm with the interior of the suction-pipe, and check-valves inserted in such pipes, the whole arranged and operated to deliver a charge of precipitant into the suction-pipe at each reciprocation of the supply-pump, substantially as set forth.

3. The combination, with a filter and a supply-pump supplying the water to the filter, of a suction-pipe through which the fluid is drawn to the supply-pump, a chamber containing a flexible diaphragm, a pipe connecting the pressure side of the diaphragm with the water-cylinder of the pump, an adjustable stop applied to the pressure side of the diaphragm, pipes connecting the opposite side of the diaphragm, respectively, with a receptacle of precipitant and with the suction-pipe, check-valves inserted in said pipes, and a load applied to one of the check-valves to prevent its opening under atmospheric pressure, the whole arranged and operated substantially as set forth.

In testimony whereof I have hereunto set my hand in the presence of two subscribing witnesses.

JOHN W. HYATT.

Witnesses:
T. H. BUMPUS,
THOS. S. CRANE.